May 20, 1969   E. J. DE BOCK   3,445,215
METHOD FOR REFINING GLASS BATHS
Filed Feb. 26, 1965
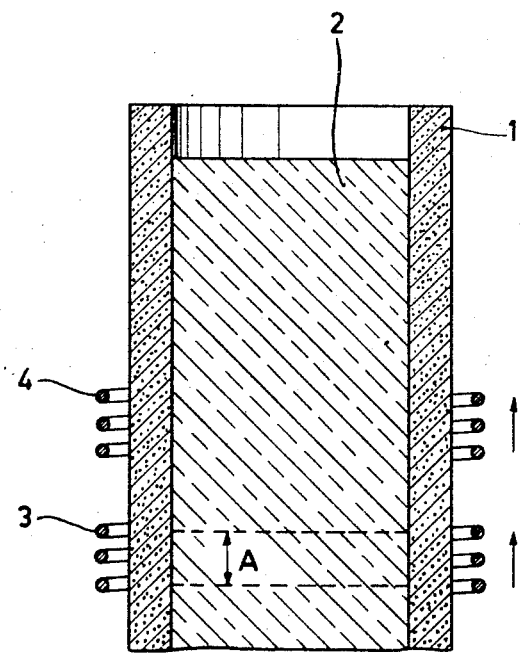
INVENTOR.
EVERT J. DE BOCK
BY
AGENT

United States Patent Office 3,445,215
Patented May 20, 1969

3,445,215
METHOD FOR REFINING GLASS BATHS
Evert Jan de Bock, Emmasingel, Eindhoven, Netherlands, assignor to North American Philips Company Inc., New York, N.Y., a corporation of Delaware
Filed Feb. 26, 1965, Ser. No. 435,534
Claims priority, application Netherlands, Mar. 13, 1964, 6402629
Int. Cl. C03b 5/16
U.S. Cl. 65—134      5 Claims

ABSTRACT OF THE DISCLOSURE

A method of treating glass comprises the steps of melting the glass material in a container, then inductively heating a small zone near the bottom of the container to raise its temperature, and finally moving the heated zone upwardly through the molten glass in the container. The method enhances the removal of gasses from the molten glass.

---

The invention relates to a method of refining a glass bath. This is to denote the removal of gases, usually in the form of bubbles, from a glass bath obtained by melting various raw materials. In the glass pot industry, this is carried out by leaving a pot filled with molten glass to itself for a long time before working the glass in the pot into glass objects. This method has a disadvantage in that long waiting times (several hours) are to be taken into consideration. With an oven for continuous glass production, a large part of the over-all time required for a quantity of molten glass to stay in the oven is occupied by the refining operation.

The invention has for its object to provide a novel method by which a glass bath can be refined rapidly.

The method according to the invention is characterized in that a substantially horizontal magnetic alternating field is applied to the molten glass to produce a rise in temperature in a localized zone forming part of the height of the glass bath. The field then is displaced with respect to the glass bath in a direction of height so that a zone of a higher temperature moves upwardly in the glass bath. With this novel method the glass bath to be refined is additionally heated inductively to an extent such that a zone of higher temperature is produced in said bath, in which the glass is less viscous. For example, the temperature at the centre of the zone may rise by approximately 50° C. and near the edge of the zone by approximately 100° C. At the same time the wall of the reservoir may remain fairly cold, for example, by air cooling of the outer wall of said reservoir. Owing to the rise in temperature in the zone concerned, the diameters of the gas bubbles and hence their rising power increase. It has been found that by displacing the zone in a direction of height through the glass bath, the rising power of the gas bubbles can be improved to a considerable extent.

If desired, the glass bath to be refined may be exposed several times to the heating effect of a moving alternating magnetic field. In this way the glass bath to be refined is traversed so to say by a number of successive heat waves. This may be important for degassing of those glass melts that can hardly be refined.

A device for carrying out the method according to the invention, arranged with a glass furnace, feeder or the like, is characterized in that at least in that part of the furnace or the like which comprises the glass bath to be refined, there are provided one or more vertically movable coils each of which produce an inductive heating zone in the glass bath.

The invention will be described more fully with reference to the accompanying diagrammatic drawing.

The drawing shows part of a refractory, preferably ceramic, container 1, which may be a refractory pot in which glass is melted, or it may be part of an oven with a vertical shaft. The glass bath to be refined is designated by the reference numeral 2.

The container 1 is surrounded by a coil 3, which can be energized in a manner known in the high-frequency induction heating art, so that this coil produces a substantially horizontal, alternating magnetic field, which is passed through the glass bath to be refined. The glass bath 2 has such a high temperature that it exhibits fairly good electrical conductivity. Owing to this inductive heating, the diameter of each gas bubble will increase, so that its rising power in the glass bath increases.

It has now been found that the rising power and the rising speed of the gas bubbles may be materially improved by raising the temperature of only a disc-shaped zone A, preferably by inductive heating, with respect to the glass lying outside said zone, and then slowly displacing the zone A upwardly along the vertical axis of the container. By way of example, the rise in temperature in a disc-shaped zone A of, for example, a few centimetres high may be 50° C. at the centre and 100° C. at the edge. The speed of movement of the zone in the vertical direction may be between 2 and 5 mms. per second.

In the embodiment shown, it is assumed that the glass bath 2 is stationary, whereas the coil 3 for high-frequency inductive heating is arranged so that it can move up and down. The manner in which this is carried out need not be explained more fully. As a matter of course, the alternating magnetic field rising through the glass bath 2 may also be obtained by means of a stationary coil 3 and a vertically movable container 1.

If desired, the container 1 may be surrounded by several coils which are displaceable in the vertical direction around the glass bath 2. This applies, for example, to the coils 3 and 4. The glass bath 2 may thus be traversed several times by an alternating magnetic field. In this manner several heat waves lying one above the other can move through the glass bath 2 in an upward direction. This is particularly important for degassing a glass bath which due to the glass type chosen can be refined only with difficulty.

What is claimed is:
1. A method of removing occluded gas from a molten glass bath having an extended viscosity range comprising the steps of heating the glass material within a container at a temperature so as to impart a given viscosity to the entire molten glass material to be processed, inductively heating a cross-sectional zone of said molten glass near the bottom of the container to a higher temperature than that of the molten glass outside of said zone thereby to produce a decrease in the viscosity of the glass within said zone, and slowly moving said heated zone upwardly through said molten glass towards the top of the container thereby to remove occluded gas from said glass bath.

2. A method as described in claim 1 wherein said inductive heating step is accomplished by applying a substantially horizontal alternating magnetic field to said glass bath and wherein said step of moving the heated zone isaccomplished by vertically displacing said magnetic field one or more times through the glass bath.

3. A method of removing occluded gas from a molten glass bath having an extended viscosity range comprising the steps of heating the glass material within a vertically disposed container at a temperature so as to impart a given viscosity to the entire molten glass material to be processed, heating a cross-sectional zone of said molten glass near the bottom of the container to a higher temperature than that of the molten glass outside of said zone thereby to produce a decrease in the viscosity of the glass within said zone, and moving said heated zone upwardly through said molten glass bath one or more times thereby to remove occluded gasses therefrom.

4. A method of treating glass comprising the steps of heating the glass material within a container at a temperature so as to maintain the entire glass material to be processed in a molten viscous state, inductively heating a plurality of longitudinal zones of said molten glass to a higher temperature than that of the molten glass outside of said zones, and simultaneously moving said plurality of heated zones through said molten glass in a direction parallel to the longitudinal axis of the container.

5. A method of removing occluded gas from a molten glass bath comprising the steps of heating the glass material within a vertically disposed container at a temperature so as to maintain the entire glass material to be processed in a molten viscous state, inductively heating a relatively narrow zone of said molten glass by means of a coil surrounding a part of said container and carrying a high frequency current that inductively heats said narrow zone to raise its temperature above that of the molten glass outside of said zone, and slowly moving said heated zone vertically through the molten glass by relatively moving said container and coil in the vertical direction.

References Cited

UNITED STATES PATENTS

| | | |
|---|---|---|
| 2,930,098 | 3/1960 | Emeis. |
| 2,998,335 | 8/1961 | Dehmelt. |
| 3,023,091 | 2/1962 | Smith. |
| 3,205,922 | 9/1965 | Descarsin. |
| 3,258,314 | 6/1966 | Redmond et al. |

DONALL H. SYLVESTER, *Primary Examiner.*

FRANK W. MIGA, *Assistant Examiner.*

U.S. Cl. X.R.

65—135, 337